United States Patent
Ruiz Herrera

(10) Patent No.: US 12,319,819 B1
(45) Date of Patent: Jun. 3, 2025

(54) THERMOLYSIS SYSTEM AND METHOD FOR OBTAINING RECOVERED CARBON BLACK AND FUEL FROM DISUSED TIRES

(71) Applicant: Luis Javier Ruiz Herrera, Ciudad Real (ES)

(72) Inventor: Luis Javier Ruiz Herrera, Ciudad Real (ES)

( * ) Notice: Subject to any disclaimer, the term of this patent is extended or adjusted under 35 U.S.C. 154(b) by 0 days.

(21) Appl. No.: 18/977,097

(22) Filed: Dec. 11, 2024

Related U.S. Application Data

(62) Division of application No. 17/622,350, filed as application No. PCT/ES2019/070450 on Jun. 27, 2019.

(51) Int. Cl.
| | |
|---|---|
| *B01D 3/06* | (2006.01) |
| *B01D 5/00* | (2006.01) |

(Continued)

(52) U.S. Cl.
CPC .............. *C09C 1/482* (2013.01); *B01D 3/06* (2013.01); *B01D 5/006* (2013.01); *B01J 6/008* (2013.01); *B03C 1/00* (2013.01); *C10G 1/002* (2013.01); *C10G 1/10* (2013.01); *F28G 1/16* (2013.01); *B03C 2201/20* (2013.01); *C10G 2300/1003* (2013.01)

(58) Field of Classification Search
None
See application file for complete search history.

(56) References Cited

U.S. PATENT DOCUMENTS

| | | |
|---|---|---|
| 3,966,487 A | 6/1976 | Crane et al. |
| 4,569,097 A | 2/1986 | Echols |

(Continued)

FOREIGN PATENT DOCUMENTS

| | | |
|---|---|---|
| CL | 2010000026 A1 | 6/2011 |
| CN | 1664486 A | 9/2005 |

(Continued)

OTHER PUBLICATIONS

Martinez et al., "Waste tyre pyrolysis—A review", Renewable and Sustainable Energy Reviews, vol. 23, 2013, pp. 179-213, ISSN 1364-0321, https://doi.org/10.1016/j.rser.2013.02.038.

(Continued)

*Primary Examiner* — Tam M Nguyen
(74) *Attorney, Agent, or Firm* — Calderon Safran & Wright PC; Corinne Marie Pouliquen

(57) ABSTRACT

The invention relates to a thermolysis system and method for obtaining recovered carbon black and fuel from disused tires, which includes a thermolysis reactor and a flash vessel acting jointly to refine fuel without the need for post-treatment to clean same. During thermolysis, condensers are cleaned without needing to cut the flow or deviate the gas stream, since the deposits formed inside tubes of a heat exchange system are cleaned using a part of the fuel obtained. The carbon black obtained is comparable to existing semi-reinforcing carbon blacks. The obtained fuel has a high content of aromatic compounds, and its carbon content is reduced to 3% by weight, up to 0.8% by weight, with respect to fuels obtained in pyrolytic processes, without requiring post-treatment such as distillation processes or catalytic treatment.

6 Claims, 2 Drawing Sheets

(51) Int. Cl.
*B01J 6/00* (2006.01)
*B03C 1/00* (2006.01)
*C09C 1/48* (2006.01)
*C10G 1/00* (2006.01)
*C10G 1/10* (2006.01)
*F28G 1/16* (2006.01)

(56) References Cited

U.S. PATENT DOCUMENTS

| | | |
|---|---|---|
| 6,485,578 B1 | 11/2002 | Park et al. |
| 7,416,641 B2 | 8/2008 | Denison |
| 7,998,281 B2 | 8/2011 | McCoy et al. |
| 8,137,508 B2 | 3/2012 | Grispin |
| 2010/0170453 A1* | 7/2010 | Betzer-Zilevitch ..... E21B 43/40 122/6 R |
| 2012/0000642 A1* | 1/2012 | Betzer Tsilevich ... E21B 43/241 166/57 |
| 2012/0289753 A1 | 11/2012 | Luengo Marin et al. |
| 2017/0227308 A1 | 8/2017 | Nitzken |

FOREIGN PATENT DOCUMENTS

| | | |
|---|---|---|
| CN | 203615822 U | 5/2014 |
| CN | 104315919 A | 1/2015 |
| CN | 104531198 A | 4/2015 |
| CN | 105694942 A | 6/2016 |
| CN | 205838923 U | 12/2016 |
| ES | 2362781 A1 | 7/2011 |
| JP | 2005074320 A | 3/2005 |
| JP | 2005134079 A | 5/2005 |
| JP | 2014142460 A | 8/2014 |
| KR | 20070048301 A | 5/2007 |
| MX | PA03002773 A | 12/2004 |
| TW | 462984 B | 11/2001 |
| WO | WO0226914 A2 | 4/2002 |

OTHER PUBLICATIONS

Muller-Steinhagen et al., "Heat Exchanger Fouling: Mitigation and Cleaning Strategies", Heat Transfer Engineering, 2011, vol. 32, issue 3-4, pp. 189-196, ISSN: 0145-7632, DOI: 10.1080/01457632.2010.503108.

* cited by examiner

THERMOLYSIS SYSTEM AND METHOD FOR OBTAINING RECOVERED CARBON BLACK AND FUEL FROM DISUSED TIRES

CROSS-REFERENCE TO RELATED APPLICATIONS AND CLAIM TO PRIORITY

This application is a divisional of U.S. patent application Ser. No. 17/622,350 filed Dec. 23, 2024, which is a national stage application of International Application No. PCT/ES2019/070450 filed Jun. 27, 2019, the disclosures of which are incorporated herein by reference and to which priority is claimed.

FIELD OF THE INVENTION

A process and a system for the thermolysis of disused tires is described to obtain recovered carbon black and fuel, of better quality than those of the state of the art, where the recovered carbon black is of a quality comparable to blacks semi-reinforcing smoke currently on the market, thanks to its surface chemistry and its behavior in rubber and where the fuel obtained has a low content of carbonaceous material.

Furthermore, the characteristics of the fuel obtained by the process of the invention allow cleaning the condensers without stopping the process, by introducing part of the same fuel obtained into the condenser tubes.

BACKGROUND AND SUMMARY OF THE INVENTION

Various pyrolysis and thermolysis processes and systems are known to treat disused tires, where a crude fuel of a dark brown to black color is obtained, the objective of which is to improve the fuel through post-treatment stages.

WO0226914 provides tire pyrolysis systems and procedures that include feeding tire strips into a pyrolysis container and pyrolysis of the strips in said pyrolysis container to produce a mixture of pyrolysis gas and carbon black; the pyrolysis gas is processed by centrifugally separating entrained particles therefrom, separating the pyrolysis gas into a hydrocarbon condensate and a light steam, extracting the entrained hydrocarbon condensate from the light steam, and purifying and refining the hydrocarbon condensate; the carbon black mixture is processed by pulverizing the mixture to break up all the filaments and masses of Inorganic solids, by cooling the carbon black mixture, separating the crude contaminants from the carbon mixture, and by purifying and refining carbon black; the hydrocarbon condensate is purified and refined by removing all remaining contaminants, removing any polycyclic aromatics to produce a clear, colorless plasticizing oil; carbon black is purified and refined by pulverizing it as a powder, removing all remaining particulate contaminants, optionally granulating the carbon black and storing it in bags or packages for shipment. However, in this document there is no use of a Flash distillation equipment that is in direct communication with the pyrolysis reactor that allows the recirculation of part of a liquid hydrocarbon phase to the pyrolysis reactor, preventing the entrainment of carbonaceous material in the gaseous stream.

Document JP2005074320 describes a device for separating pyrolysis residues generated at the moment when such residues, such as a waste tire, are dry distilled. This device, to separate metal and carbide included in the pyrolysis residue generated at the time the residue is dry distilled, comprises: a hopper that introduces the pyrolysis residue in a water tank while protecting the pyrolysis residue from the air; a paddle arranged below the layer of water in the hopper rotates to generate a flow of water; a metal recovery apparatus recovers the precipitated metal at the bottom of the water tank; and a carbide recovery apparatus recovers the carbide floating on the surface of the water from the water tank. This document does not specify the pyrolysis process itself, but rather the treatment of the residues originated in a pyrolysis process, for the same reason neither a stage nor a Flash distillation equipment is described.

Document CL-51,252 (application CL-26-2010) describes a method of heat treatment of used tires, based on the preheating of the raw material previously crushed, in a feeding mechanism of a vertical reactor, which allows to increase the efficiency of the heat treatment through the reduction of energy consumption, by means of the use of residual energy, said method comprises: (a) supplying the previously shredded used tires to a conveyor; (b) feeding said used tires to a feed mechanism located above a reactor; (c) preheating said used tires inside said feed mechanism, with a first stream of first exhaust gases from an internal combustion engine; (d) feeding said used and preheated tires to said reactor; (e) supply a second stream of exhaust gases from the engine through a first gas connection tube located in the middle zone of said reactor or thermolysis reaction zone, generating in said reactor an oxygen-free environment, generating with said thermolysis reaction a stream of thermolysis gas exiting the reactor through an outlet and a volume of solid thermolysis products falling towards the Lower portion of said reactor; (f) recirculate the gases used in step (c) from inside the feed mechanism to an inlet tube located in a Lower cooling zone of the reactor to cool the solid products of thermolysis obtained in step (e); (g) evacuate the solid products of thermolysis cooled in step (f), such as carbon black, mineral aggregates from tires, metallic reinforcement and others, which exit through the lower part of the reactor through a feeder lock towards a receiver to solid products of thermolysis; (h) delivering the cooled solid thermolysis products through an exclusive feeder to a magnetic separator to separate the solid thermolysis products, carbon black and others, from the metallic reinforcement; and (i) recirculating said thermolysis gas stream. Although a tire thermolysis process is described, it is not carried out in a horizontal cylindrical reactor, nor is the reactor atmosphere inerted with nitrogen, the combustion gases are in direct contact with the material to be thermolyzed, unlike the present invention, wherein the heat flow is through an external chamber surrounding the reactor. Furthermore, in CL-51,252, a recirculation operation of liquid hydrocarbons from a flash distillation vessel to the reactor is not mentioned, nor is a particular design of the distillation cylinder specified.

Document JP2014142460 describes a system for treating waste tires, plastic waste, etc. for conversion into a pyrolysis oil that uses the energy of the pyrolysis gas in a high temperature state to separate 1-Petroleum (Class 1 Petroleum) efficiently, from the oil content. The treatment system for conversion to pyrolysis oil includes a lower tank, a heater to heat the lower tank, a distillation cylinder having a waste gas outlet at the top, a cooling region, an ingredient collection means liquefied ingredients for collecting the liquefied ingredients in a cooling portion, a temperature sensor provided immediately above the liquefied ingredient collecting means within the distillation cylinder, and control means for controlling the heater. Although a system for the pyrolysis of tires is described, which includes, among others, a distillation cylinder after the pyrolysis reactor, a recirculation operation from this distillation cylinder to the reactor is not described, nor is a particular design of the cylinder specified distillation.

Document TW462984 describes a method for recycling solid waste such as waste tires, which comprises using a series of steps including: heating, dry distillation and pyrolysis, to form solid gases and carbides; discharge solid carbides from the bottom of the reactor furnace; applying a series of processing steps, including water washing, magnetic selection, alkaline washing, acid washing, on the solid carbides to separate the steel wires and remove the ash content containing heavy metals; pulverizing the carbides to a desired particle size to form a high purity carbon black; Introducing the carbon black into an activation furnace to heat it and activate it in a steam environment, thus producing a granular activated carbon; condensing the gas product and applying an oil/gas separation step on the gas product to form fuel oil and fuel gas by-products. Such fuel oil and/or fuel gas can be introduced into a pyrolysis furnace and an activation furnace as fuel for heating outside the furnace. In this document a dry distillation is described together with a pyrolysis, however, the pyrolysis reactor is not of horizontal operation surrounded by an outer chamber, on the other hand the Flash distillation vessel does not present the particular design that is described in the present invention.

On the other hand, an additional advantage of the present invention is related to the cleaning of the condenser tubes used in the thermolysis process, which is carried out with part of the fuel obtained through the process of the invention, which is it passes in co-current together with the process flow that flows through the tubes of the condensers.

Generally, the cleaning of the heat exchangers inside is carried out during the maintenance of the equipment and/or by diverting the gas stream to condense, to inject a cleaning stream instead.

For the cleaning of exchangers, techniques such as:
High pressure washing with a flow of water from the disassembled equipment, inside or outside the plant and during maintenance periods.
Use of chemical products to eliminate deposits inside the equipment that has been dismantled or not, inside or outside the plant, during maintenance or operation, in the latter case, it is necessary to cut off the supply to the process flow, using recirculation systems (U.S. Pat. No. 6,485,578 B1).
Use of tools to clean tubes, commonly with a rod in a disassembled equipment inside or outside the plant during maintenance.
Use of robotic system to clean the heat exchanger in situ, without disassembling the equipment, but with process flow cut-off (CN1664486 A).
Inline cleaning system with a system of cleaners such as solid spheres capable of dragging the deposits out of the tubes, without interrupting the process flow (CN104315919, CN203615822 U, U.S. Pat. No. 4,569,097 A).

In particular JP 2005134079 describes a method and equipment that wishes to efficiently remove contamination from cooling tubes of a condenser for the condensation of polystyrene pyrolysis gas. Wherein inside a condenser cooling tubes are arranged through which a refrigerant is passed. The polystyrene pyrolysis gas from a thermal decomposition device is supplied to the condenser, in which it is cooled by exchanging heat with the refrigerant in the cooling tubes and a high-boiling component containing styrene is condensed as an oil (fuel). When the surfaces of the cooling tubes are contaminated, the oil obtained by condensation is sprayed on the surface of the cooling tubes by a spray medium, and the contaminant is removed by the cleaning effect of the spray. Although in this document the cleaning of a condenser associated with a pyrolysis process is implicitly mentioned, this cleaning is not carried out with the injection of a hydrocarbon fuel obtained in the same process, recirculated in co-current. While in the present invention, the fuel obtained has a high content of aromatic compounds that allow the fuel to have a high dissolving power of the embedded solids inside the condenser tubes. Furthermore, in the present invention, cleaning is more efficient since it not only depends on the fuel outlet pressure through the injectors, but also depends on the characteristics of the fuel, that is, the product that cleans the interior of the fuel, the condenser tubes and their ability to dissolve the internal scale of the condenser tube. The fact that the fuel injection into the tubes is carried out in co-current, generates a synergic drag effect between the cleaning fluid (fuel) and the process gas flow, increasing the cleaning efficiency in relation to with other similar systems. Furthermore, the invention has a filtering system for the fuel, where a fraction of this is recirculated for cleaning the condenser tubes, where the residues carried by this fraction are trapped in the same filter. In document JP2005134079, the refrigerant or service fluid passes through the interior of the tubes and the cleaning is generated on the external surface of the tubes through which the process fluid or the gaseous stream to be condensed passes.

Document U.S. Pat. No. 7,998,281 B2 refers to an apparatus for in-line cleaning and maintenance of a tubular heat exchange line. The injection of a fluid that will clean at high pressure is considered, without intervening in the process line, that is, without opening the equipment or stopping the operation. Its field of application is in the petrochemical industry, especially to cool the effluent that comes out of the cracking kiln. This document does not use the same product obtained by the process as a cleaning product, that is, it does not use a hydrocarbon fuel produced in the same process, with the characteristics obtained thanks to the system and process of the invention. On the other hand, the heat exchange system of said document is related to a tubular type of exchanger (a line with a water jacket) and not to a shell and tube exchanger as used in the present invention.

DETAILED DESCRIPTION OF THE PREFERRED EMBODIMENT(S)

Figure 1:
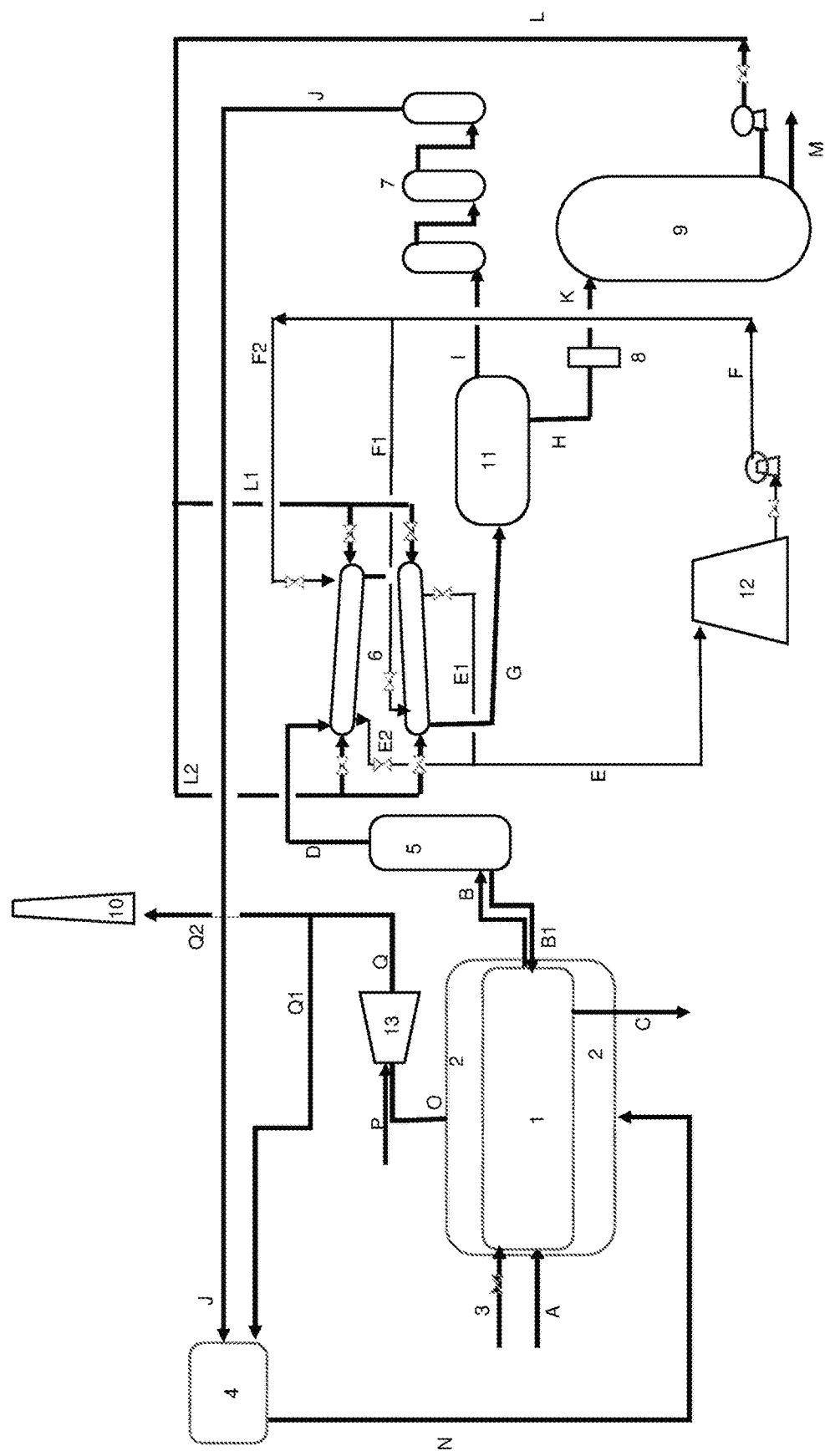
FIG. 1: Flow diagram of the process of the invention where each of the components of the system of the invention are identified, together with the flow currents involved.

The process of the invention will be explained through the flow diagram of FIG. 1, identifying each of the streams involved in the process and each of the components of the system of the invention.

The thermolysis process for obtaining recovered carbon black and fuel from disused tires comprises the following stages:

a) crushing the disused tires until reaching pieces of rubber with a size between 0.1" to 4" (0.25 cm to 10.16 cm);
b) feeding the crushed material (A) to a rotating horizontal cylindrical thermolysis reactor (1), which is surrounded by an outer chamber (2);
c) close the reactor (1) and feed the reactor an inert gas (3), preferably gaseous nitrogen, in order to generate an oxygen-free atmosphere (between 99.0% and 99.9%) and maintaining a gauge pressure inside the reactor between 10 and 200 mbar (1 and 20 kPa);
d) indirectly heating the reactor (1) with gases (N) that come from a combustion chamber (4), which are directed to the outer chamber (2);
e) increase the temperature gradually from room temperature and keep it in a range between 250° C. and 350° C. for a period of between 1 to 4 hours, gasifying the water, all the lighter hydrocarbons and part of the heaviest hydrocarbons;
f) increase the temperature again to more than 450° C., achieving the gasification of the heavy hydrocarbon that was still in a liquid state, during a period of between 2 to 4 hours.
g) obtaining from the assembly of reactor (1) and outer chamber (2) a gaseous stream of hydrocarbons (B), combustion gases (O) and recovered carbon black (C);
h) cooling the recovered carbon black (C) inside the reactor (1) and extracting the residual hydrocarbons from the recovered carbon black by stripping with the inert gas (3) and extracting the recovered carbon black (C) from the reactor (1);
i) take the hydrocarbon gaseous current (B) to a Flash distillation container (5), where thanks to the design of the Flash container (5) and due to pressure changes inside it, a part of the current remains in the gaseous phase (D) and another goes to the liquid state (B1);
j) passing the gaseous stream (D) from the Flash container (5) towards a system of heat exchangers (6), where a part of the gaseous stream is condensed and another part is kept in a gaseous state, finally obtaining a stream biphasic (G) at the end of the passage through the heat exchanger system (6);
k) take the two-phase current (G) that leaves the exchanger system (6) to a phase separation tank (11) where a separation of the condensate with the gas occurs due to the effect of the phase difference of the two-phase current (G), producing a gas phase current (I) and a liquid phase current (H);
l) direct the gaseous phase (I) towards a battery of water seals (7), whose current (J) then feeds the combustion chamber (4) to generate the necessary heat in the process and make it energetically self-sustaining;
m) direct the liquid phase (H) towards a filtering system (8) to obtain a filtered fuel stream (K) that is stored for commercialization (M) in a final storage tank (not shown in the figures), where a part of this filtered fuel stream (K) remains in a lung container (9); and
n) use part of the fuel (L) produced and that comes from the buffer container (9) in cleaning (L1, L2 . . . ) in co-current of the interchangers system (6).

Before the crushing stage and during the crushing stage, there is a metal extraction, with for example a magnetic separator (not shown in FIG. 1).

In stage e) there is a heat transfer from the external chamber (2) to the reactor (1) where the crushed material (A) is located, which regulates the supply of fuel (J) to the combustion chamber (4) through a control loop that takes the temperature signal inside the reactor, to avoid violent processes of sublimation of the rubber and preventing the increase of excessive gas flows that drag carbonaceous material.

The reactor (1) has a temperature sensors system that delivers a signal to the control loop system, with which through a set temperature it is possible to regulate the amount of fuel (J) that is used in the combustion chamber (4) and therefore the amount of combustion gases (N) that is fed to the outer chamber (2) of the reactor (1).

Furthermore, in stage e) a liquid bed is maintained in which the liquid/vapor phase is in equilibrium within the reactor (1).

Thermolysis inside the reactor (1) ends when there is no longer gas generation, after the second temperature increase in stage f), which is monitored through a gas flow sensor. The maximum residence time of the crushed material in the reactor (1) is 12 hours.

The combustion chamber (4) is capable of working with gaseous or liquid fuel, generating the thermal energy necessary to reach the operating conditions of the reactor (1), using the combustion gases as a heat source for the reactor.

The Flash distillation vessel (5) has a vertical cylindrical design such that its upper part, where the gas phase is located, is of greater volume in relation to its lower part, where the liquid phase accumulates, this allows the return to the reactor (1) of the liquid phase (B1) separated by the effect of the pressure change in the same Flash container (5). At the same time, the dragging of carbonaceous material in the stream (D) that remains in the gaseous state is prevented, due to the reduction in the speed of this flow, with which the heavy hydrocarbons present in the liquid phase (B1) are reprocessed since this design has an overflow, which allows the hydrocarbons in the liquid phase to return (B1) to the reactor, reducing the carbonaceous residues in the final fuel in addition to reducing the particulate material that is deposited inside the tubes (14) of the heat exchanger system (6).

The combustion gases (N) that are generated in the combustion chamber (4) pass through the outer chamber (2) of the reactor (1) providing the heat necessary to carry out the thermolysis of the crushed rubber material (A).

The combustion gases (O) exiting the outer chamber (2) are joined with fresh air (P) in a centrifugal blower (13) to generate a stream of fresh combustion gases (Q). Part of this stream (Q) of fresh combustion gases is recirculated (Q1) to the combustion chamber (4) in order to improve energy efficiency and ensure complete combustion of the gases, with this air (P) that has been preheated thanks to the combustion gases (O) that came out of the outer chamber (2) of the reactor (1), the remaining fraction (Q2) is released into the atmosphere (10).

The water seal battery (7) of stage l) consists of a series of vertical containers with water through which the non-condensed gas (I) passes, acting as a safety system to prevent the gas from igniting.

One of these vertical containers of the water seal battery (7) contains a solution of calcium hydroxide or caustic soda, which reduces the sulfur content of the gaseous stream (I).

Figure 2:
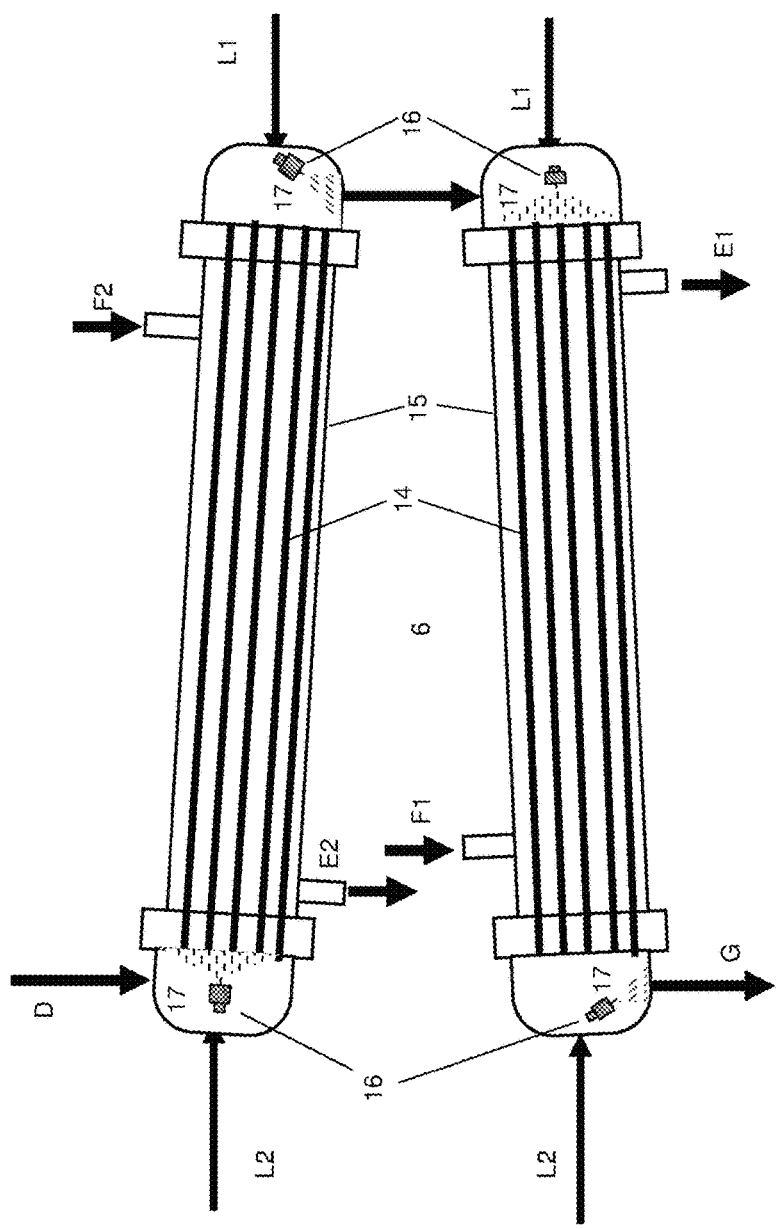
FIG. 2: Explanation of the condensation system with 2 heat exchangers in series, where the use of part of the produced fuel that is being recirculated from the buffer tank for temporary fuel storage is indicated.

The heat exchanger system (6) comprises at least two tube (14) and shell (15) exchangers in series (as shown in FIG. 2) or in parallel (not shown).

In the heat exchanger system (6) that is used in stage j) the following stages are carried out, to achieve the cleaning of the interior of the tubes (14), without the need to stop the operation/process:

j.1) introduce to the gas stream (D) coming from the Flash container (5) in co-current, part of the generated fuel (L1, L2 . . . ) inside the tubes (14), where the recirculation current fuel (L1, L2 . . . ) it enters the Interior of the heads (17) of the tubes (14) through injectors (16) oriented in a direction co-current with the flow of the gas stream;

j.2) introducing the stream of cooling water (F1, F2 . . . ) coming from a cooling circuit (12) to the casing (15); and j.3) clean the inside of the tubes (14) thanks to the high pressure with which the recirculated fuel (L1, L2 . . . ) is injected and its dissolving capacity, dragging the material deposited into the tubes (14).

There will be an injector (16) for every 4 tubes (14) to ensure proper cleaning of the interior of these in each heat exchanger.

The recirculation of the fuel stream (L1, L2 . . . ) is automatically activated when the efficiency of heat exchange is lost, which occurs when the difference between the temperatures of the input and output of the stream is reduced of cooling water (E, E1, E2.) that passes through the casings (15) of the heat exchangers, where said stream of cooling water (E, E1, E2.) is directed to the cooling circuit (12) to return to the heat exchanger system (6). Where said verification is carried out through sensors.

The system and process of the invention obtains as products a recovered carbon black (C) and a liquid fuel (L) whose main characteristics are described below:

The recovered carbon black has a quality comparable to the semi-reinforcing carbon blacks currently on the market, thanks to its surface chemistry and its behavior in rubber, depending on the application it can partially or totally replace conventional carbon blacks, such as those used where heat dissipation is required.

The recovered carbon black obtained can be applied to various rubber elements such as motor vehicle components, shoe soles, hoses; anti-vibration elements; roof covers; conveyors; in addition to black inks for the graphic industry; and for black pigment in the plastics industry.

One of the main advantages of the recovered carbon black obtained by the invention is that, with respect to conventional carbon black production processes, the emission of $CO_2$ is considerably reduced. It is estimated that to produce 1 ton of carbon black recovered through the process of the present invention, 130 kg of $CO_2$ are generated compared to the 2.5 Ton of $CO_2$ generated by the production process of a conventional carbon black, which equates to a 95% reduction in carbon footprint.

For its part, the fuel obtained by the invention has the following characteristics:

It is a fuel with a calorific value that is in the range of traditional fuels such as diesel oil and No. 6 fuel oil. It has low viscosity so it can be used as an additive and improve the performance of more viscous fuels. Its pour point and cold filter plugging point occur at lower temperatures than in traditional fuels, which gives it an operational advantage when using it in places with extreme conditions such as low temperatures in mountain ranges.

Compared to heavy fuels, fuel has a lower content of sulfur, carbonaceous material, ash, sediment and water, which translates into lower emissions of pollutants.

The use of this fuel has a neutral fraction of $CO_2$ emissions, due to the fact that they are obtained from tires that have biomass (natural rubber) in their composition.

The fuel obtained from the thermolysis process can be used in stationary engines, electric generators, boilers to heat water and generate steam, use as an additive for heavy fuels, and as raw material for the manufacture of other products.

It is a cleaner liquid fuel, with an aromatics content of more than 90%, compared, for example, with that obtained by U.S. Pat. No. 8,137,508B2 with a maximum of 80% aromatics and with that obtained in the patent application CN 105694942 reaching 60% aromatics. This high content of aromatics in the fuel allows it to act as a solvent for the solid material adhered to the interior of the tubes of the heat exchanger system (6). In addition to the condition of injection under pressure of the fuel in the tubes of the heat exchanger system, the fuel obtained performs the cleaning of the interior of the tubes synergistically due to the high content of aromatics in the fuel.

In the current state of the art, a brown to black fuel is obtained mainly due to the higher content of carbonaceous material, the fuel obtained by the invention is amber to brown in color, due to the lower content of carbonaceous material.

In those processes of the state of the art in which the post-treatment of the fuel is considered through distillation and/or the use of catalysts, cleaner fuels are obtained, however, to achieve this, a greater investment in equipment must be made, it is obtained lower yields, additional waste is generated, and operational cost is increased.

The percentage of carbonaceous residues of the fuel in the invention is between 0.8% and 3% by weight, which is compared to that obtained in the state of the art, but with the application of various post-treatment techniques, such as the use of distillation or catalysts to improve fuel quality, however in the invention there is no post-treatment.

On the other hand, the invention deals with a thermolysis system for obtaining recovered carbon black and fuel from disused tires that comprises the following components:

i. a rotating horizontal cylindrical thermolysis reactor (1), which is surrounded by an outer chamber (2), where the reactor (1) receives the crushed material (A) to be treated, obtaining from this set (reactor and outer chamber) a gaseous stream of hydrocarbons (B), combustion gases (O) and recovered carbon black (C);

ii. a combustion chamber (4), which indirectly heats the reactor (1) with gases (N) which are directed to the outer chamber (2);

iii. a Flash distillation vessel (5), which receives the hydrocarbon gas stream (B) from the reactor (1), where thanks to the design of the Flash vessel (5) and due to pressure changes inside it, a part of the current remains in the gaseous phase (D) and another becomes liquid (B1);

iv. a system of heat exchangers (6) that receives the gaseous stream (D) from the Flash container (5), where a part of the gaseous stream is condensed and another part is kept in a gaseous state, obtaining finally a two-phase current (G) at the end of the passage through the heat exchanger system (6);

v. a phase separation tank (11) that receives the two-phase current (G) that leaves the exchanger system (6), where a separation of the condensate with the gas occurs due to the difference in phases of the two-phase current (G), producing a current in the gas phase (I) and a current in the liquid phase (H);

vi. a battery of water seals (7) that receives the gas phase (I), generating a current (J) that then feeds the combustion chamber (4) to generate the necessary heat in the process and make it energetically self-sustaining;

vii. a filtering system (8) that receives the liquid phase (H) to obtain a filtered fuel stream (K); and viii. a lung container (9) that stores a part of the filtered fuel stream (K) of the total fuel that is stored (M) for sale in a final storage tank (not shown in the figures)

The system also comprises a cooling circuit (12), which keeps the process water that circulates through the heat exchange system (6) cold.

The invention claimed is:

1. A thermolysis system for obtaining recovered carbon black and fuel from disused tires, comprising:
   i. a rotating horizontal cylindrical thermolysis reactor, which is surrounded by an outer chamber, wherein the rotating horizontal cylindrical thermolysis reactor receives crushed material to be treated, to provide a gaseous stream of hydrocarbons, combustion gases and recovered carbon black;
   ii. a combustion chamber, which indirectly heats the rotating horizontal cylindrical thermolysis reactor with gases which are directed to the outer chamber;
   iii. a flash distillation container, which receives the gaseous stream of hydrocarbons from the rotating horizontal cylindrical thermolysis reactor, wherein a part of the gaseous stream of hydrocarbons is kept in the gas phase and another goes to liquid state;
   iv. a system of heat exchangers that receives the gas phase from the flash distillation container, wherein at least a portion of the gas phase is condensed and another portion is kept in a gaseous state, obtaining a two-phase current at the outlet of the system of heat exchangers;
   v. a phase separation tank that receives the two-phase current that leaves the system of heat exchangers, wherein a separation of condensate from gas occurs due to the difference in phases in the two-phase current, producing a first current in the gas phase and a second current in the liquid phase;
   vi. a battery of water seals that receives the first current, generating a third current that then feeds the combustion chamber to generate the necessary heat for the process to be self-sustaining;
   vii. a filtering system that receives the second current to obtain a filtered fuel stream; and
   viii. a container that stores at least a portion of the filtered fuel stream.

2. The system according to claim 1, further comprising a cooling circuit to cool water that circulates in the system of heat exchangers.

3. The system according to claim 1, wherein the flash distillation container has a vertical cylindrical design such that an upper part of the flash distillation container, where the gas phase is located, is of greater volume in relation to a lower part of the flash distillation container, where the liquid phase accumulates, which allows a return to the rotating horizontal cylindrical thermolysis reactor of the liquid state separated by the effect of the pressure change in the flash distillation container, preventing the drag of carbonaceous material in a stream that remains in the gaseous state, due to the speed reduction of the flow, with which the heavy hydrocarbons present in the liquid state are reprocessed with an overflow, which allows the hydrocarbons in the liquid state to return to the rotating horizontal cylindrical thermolysis reactor, reducing the carbonaceous residues in the fuel in addition to reducing particulate materials that are deposited inside tubes of the system of heat exchangers.

4. The system according to claim 1, wherein the water seal battery consists of a series of vertical containers with water through which non-condensed gas passes, acting as a safety system to prevent the ignition of the gas.

5. The system according to claim 1, wherein the system of heat exchangers comprises at least two tubes and shell heat exchangers in series or in parallel.

6. The system according to claim 1, further comprising a plurality of sensors, wherein the rotating horizontal cylindrical thermolysis reactor has a temperature sensor system that delivers a signal to a process control loop system, with which through a set temperature regulates the amount of fuel that is used in the combustion chamber and thus the amount of combustion gases that is fed to the outer chamber of the rotating horizontal cylindrical thermolysis reactor; and a flow sensor to monitor the completion of thermolysis inside the rotating horizontal cylindrical thermolysis reactor by recording when the gas generation is completed.

* * * * *